United States Patent [19]

Grassel

[11] 4,345,922
[45] Aug. 24, 1982

[54] AIR CLEANER WITH ANTI-REENTRAINMENT

[75] Inventor: Eugene E. Grassel, Oak Ridge, Tenn.

[73] Assignee: Donaldson Company, Inc., Minneapolis, Minn.

[21] Appl. No.: 218,615

[22] Filed: Dec. 22, 1980

[51] Int. Cl.³ .............................................. B01D 46/04
[52] U.S. Cl. ........................................ 55/302; 55/294; 55/432; 55/337
[58] Field of Search ............... 55/96, 302, 337, 419, 55/420, 432; 210/304, 333.01

[56] References Cited

U.S. PATENT DOCUMENTS

| Re. 24,954 | 3/1961 | Church. | |
|---|---|---|---|
| 1,073,883 | 9/1913 | Aikman. | |
| 3,078,650 | 2/1963 | Anderson et al. | |
| 3,541,764 | 11/1970 | Astrom | 55/337 |
| 3,568,414 | 3/1971 | Spriggs | 55/337 |
| 3,680,283 | 8/1972 | Jones. | |
| 3,936,902 | 2/1976 | Shackleton et al. | |
| 3,954,426 | 5/1976 | Brange. | |
| 3,957,639 | 5/1976 | Schoen et al. | |
| 4,113,449 | 9/1978 | Bundy | 55/96 |
| 4,128,227 | 8/1980 | Frey | 55/302 |
| 4,174,204 | 11/1979 | Chase | 55/302 |

FOREIGN PATENT DOCUMENTS 598251  2/1948  United Kingdom ................. 55/309

Primary Examiner—Bernard Nozick
Attorney, Agent, or Firm—Merchant, Gould, Smith, Edell, Welter & Schmidt

[57] ABSTRACT

An air cleaner including a casing having an inlet for air to be cleaned and an outlet for cleaned air, a filter in the casing separating the inlet from the outlet, a shroud in the casing separating the filter from the inlet, a first valving arrangement operable to enable flow of air from said inlet to said filter or to disable flow of air from said filter to said inlet, and a second valving arrangement operable to prevent inflow of air to said filter or to enable a scavenge flow of air from said filter.

3 Claims, 6 Drawing Figures

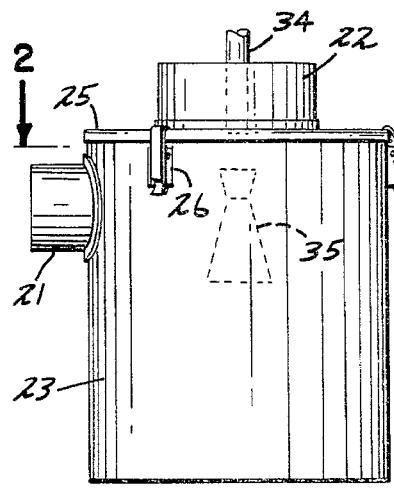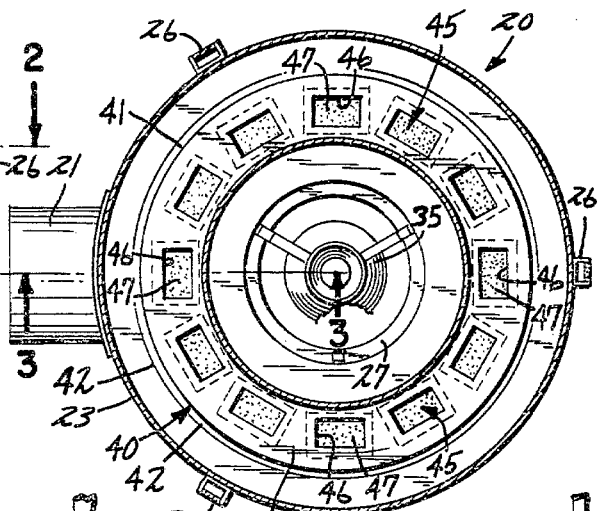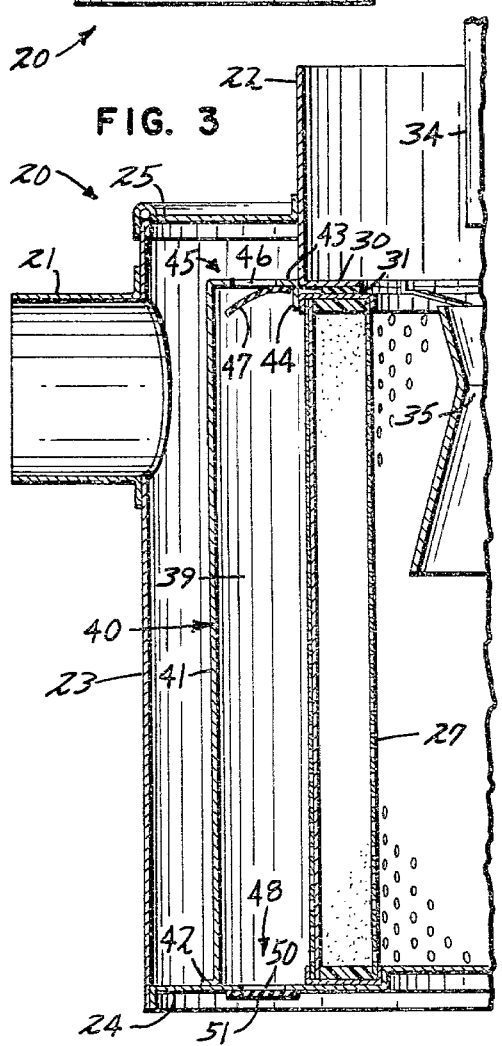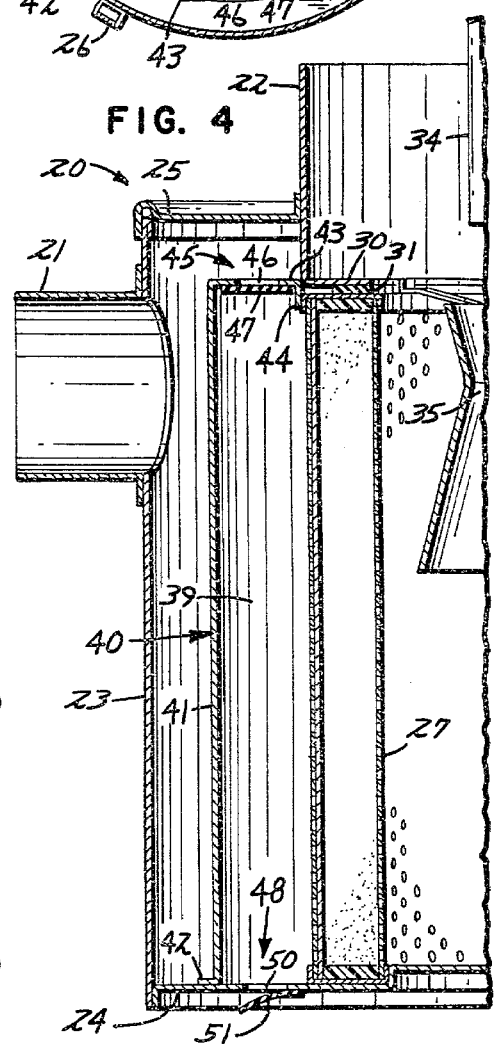

FIG. 6

AIR CLEANER WITH ANTI-REENTRAINMENT

TECHNICAL FIELD

This invention relates to the field of air cleaners, and particularly to such cleaners designed for dislodgement and scavenging of collected pollutant particles by reverse jets of air.

BACKGROUND OF THE INVENTION

A common form of air cleaner is one in which the polluted air is passed through a filter of porous material, so that pollutant particles are collected on one surface of the filter and clean air emerges from the other surface of the filter.

After a period of operation the quantity of pollutant collected on the filter becomes so great as to cut down the ability of the filter to treat the required volume of air, and the filter must be either replaced or renewed, that is, freed of the collected particles. The latter is preferable, as it can be done without shutting down the air cleaning system and the equipment served thereby.

A common way of renewing a filter is by projecting clean air through the filter in a reverse direction, the dislodged particles dropping from the filter to be scavenged or removed by well-known methods. The entire filter may be subjected to a pulse of renewing air at the same time, briefly reversing the normal air flow, or a jet of limited dimensions may be directed at successive limited portions of the filter in a repeated cycle, so that while each minor portion of the filter is being renewed, the remaining portions continue in the normal function, and normal flow is never completely interrupted.

It has been found that particulate matter released from a filter has a tendency to reattach to the filter when the renewing air flow ceases and normal flow resumes, and this reduces the efficiency of the filter.

BRIEF SUMMARY OF THE INVENTION

The present invention prevents reattachment of dislodged particles to the filter, by causing them to be swept entirely out of the cleaner at the time they are dislodged. This is accomplished by surrounding the filter with a shroud and providing inlet and outlet valving means which operate automatically in response to changing pressure incident to the renewing air flow. The inlet valving means normally enables air movement toward the filter, but prevents air movement in the opposite direction. The outlet valving means operates to conduct renewing air from the filter to scavenge dislodged particles, but normally prevents the passage of air to be cleaned and directs it to the filter.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described preferred embodiments of the invention.

BRIEF DESCRIPTION OF THE DRAWING

In the drawing, in which like reference numerals indicate corresponding parts throughout the several views, FIG. 1 is a schematic general showing in elevation of an air cleaner embodying the invention;

FIG. 2 is a view to a larger scale in transverse section along the line 2—2 of FIG. 1;

FIGS. 3 and 4 are fragmentary views in longitudinal section, to a larger scale, taken along the line 3—3 of FIG. 2;

FIG. 6 is a view in longitudinal section of the cleaner of FIG. 5.

DESCRIPTION OF THE FIRST PREFERRED EMBODIMENT

Figure 5:
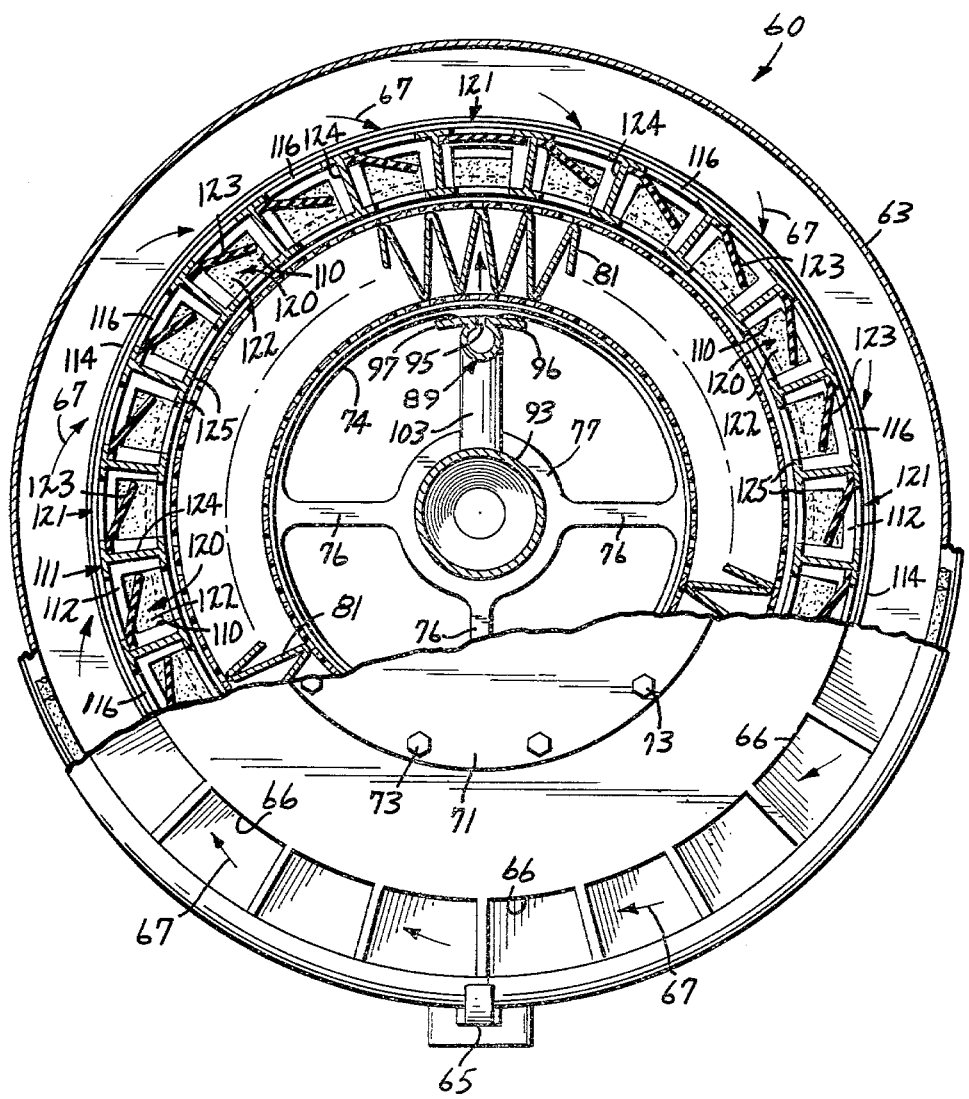
FIG. 5 is a plan view, partly in transverse section, of an engine air cleaner embodying an alternate form of the invention.

In FIG. 1 an air cleaner 20 is shown to have an inlet 21 for air to be cleaned and an outlet 22 for cleaned air. Inlet 21 comprises a lateral opening in a casing 23 having a generally closed bottom 24, and may admit air radially or tangentially. Outlet 22 comprises an axial opening in the otherwise closed cover 25 of casing 23, to which the casing is removably secured as by catches 26.

As shown in FIGS. 3 and 4, a hollow cylindrical filter 27 preferably of pleated paper is secured between bottom 24 of casing 23 and an inturned lip 30 of cover 25, a sealing gasket 31 being provided, so that air flow is inward through the filter and particulate matter carried in the air is collected on the outer surface of the filter.

The normal flow of air through cleaner 20 is repeatedly interrupted by short pulses of clean air, in the opposite direction, at such a pressure as to momentarily reverse the flow through the filter and dislodge particulate matter collected on the outer surface thereof, so that it may drop from the filter and be suitably scavenged. A structure for doing this is shown to comprise a jet 34 of clean high-pressure air which discharges intermittently into the filter 27 through a venturi 35. The frequency, duration, and pressure of the reverse-cleaning pulses are determined by the user in accordance with the nature of the pollutant particles, as is well known.

In order to prevent redeposit on the filter of particles dislodged therefrom by the reverse-cleaning pulses, a shroud 40 is mounted in casing 23 to define a closed space 39 surrounding filter 27. Shroud 40 comprises cylindrical wall 41, which is secured to bottom 24 by means of a lip 42, and an end annulus 43, which is in sealing engagement by means of a lip 44 with the top of filter 27 and with lip 30 of outlet 22.

Annulus 43 is provided with inlet valving means comprising a plurality of inlet valves 45 including apertures 46, each provided with a shutter or flapper 47 of suitable resilient material to operate with the aperture as a form of check valve. Air flow inward through the aperture is enabled, by flexure of flappers 47, as shown in FIG. 3, but air flow in the opposite direction is prevented by closing the flappers, as shown in FIG. 4.

Outlet valving means 48 is also provided, and comprises a ring of apertures 50 in bottom 24, within shroud 40, associated with shutters or flappers 51 which are somewhat less resilient than flappers 47, and which close apertures 50 during normal flow of air through the cleaner. If the pressure within the shroud becomes sufficiently high, as occurs during reverse-cleaning pulses, flappers 51 open as shown in FIG. 4 to enable exit of air bearing pollutants discharged from the filter, suitable scavenging.

OPERATION OF THE FIRST PREFERRED EMBODIMENT

The embodiment of the invention just described operates as follows. Air to be cleaned of particulate matter is supplied to inlet 21, and cleaned air is conducted from outlet 22, the normal air flow being maintained by a suitable fan or other means maintaining a superambient pressure at inlet 21 or a subambient pressure at outlet 22. Valving means 45 is open by the normal air flow, but valving means 48 is closed. Jet 34 is connected to a source of clean air at a pressure higher than that at inlet 21, the connection including the usual solenoid valve and timing switch or equivalent structure to admit air to the jet in repeated short pulses.

During normal operation air from inlet 21 flows into casing 23 through valving means 45 into space 39. The air passes inwardly through filter 27, while particulate pollutants are collected on the outer surface of the filter. Each time that a pulse of reverse-cleaning air is admitted to jet 34 it passes downwardly through venturi 35, raises the pressure within the filter, and flows outwardly therethrough, dislodging particles from its outer surface. The pressure in space 39 rises, so that first flappers 47 close apertures 46, and then flappers 51 open apertures 50, so that for a short interval air flows from space 39 through apertures 50, sweeping the dislodged particulate matter with it to atmosphere or to a suitable scavenge receptacle not shown.

When the flow of air to jet 34 ceases, the pressure in space 39 decreases, flappers 51 close apertures 50 and then flappers 47 open apertures 46. This operation continues repeatively for extended intervals without the need of interrupting operation because of loss of efficiency of the filter.

DESCRIPTION OF A SECOND PREFERRED EMBODIMENT

Figure 6:
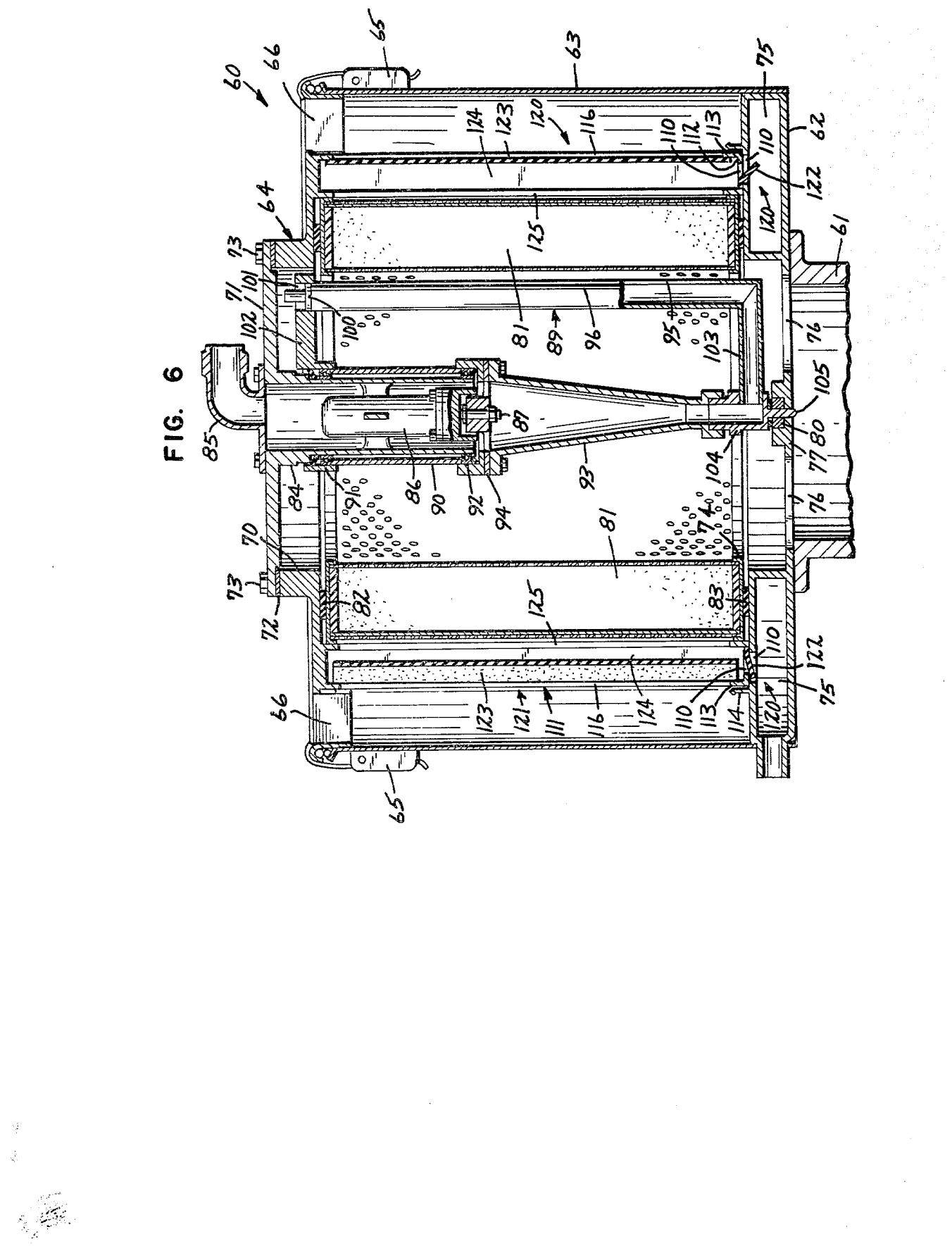

The embodiment of the invention shown in FIGS. 5 and 6 comprises an air cleaner 60 for use in supplying clean air to the inlet conduit 61 of an internal combustion engine, not shown. The cleaner comprises a base 62 to which is secured a casing 63, and a cover 64 secured to casing 63 by suitable catches 65. Cover 64 admits air to be cleaned into casing 63 through an annular plurality of apertures 66 which may be configured to give the entering air a circular motion around the inside of casing 63, as suggested by arrows 67 in FIG. 5. A large central aperture 70 is formed in cover 64, to which a mounting plate 71 is secured by fastening means including a gasket 72 and fasteners 73 such as machine screws. Another large central aperture 74 coaxial with aperture 70 is formed in base 62. It is surrounded by a scavenge manifold 75, and includes spokes 76 supporting a central boss 77 containing a bearing 80.

A filter 81, preferably of pleated paper, of hollow cylindrical configuration is mounted in cleaner 60 between base 62 and cover 64, being secured against gaskets 82 and 83 when catches 65 are fastened. Normal operation of the engine produces a negative pressure at aperture 74 which draws air into the cleaner at apertures 66 and through filter 81, airborne particulate matter being collected on the outer surface of the filter.

Means are provided for reverse-jet cleaning the filter, as follows. Mounting plate 71 includes a hollow downwardly extending central tubular leg 84 in communication at its upper end with a connection 85 for clean air under positive pressure. Secured within leg 84 is a motor 86 having a drive shaft 87. A tubular body 90 is mounted on leg 84 in bearings 91 and 92, and is connected to a frustoconical air conduit 93 by a coupling plate 94 connected in driving relation to motor shaft 87. The arrangement is such that a free passage for air exists from connection 85 through leg 84, past motor 86, through plate 94, and into conduit 93.

An elongated tubular manifold 89 is disposed within the cleaner and extends parallel and close to the inner surface of filter 81: it includes a longitudinal slot 95 bordered by winds 96 and 97. The upper end of manifold 89 is closed by a plug 100 and is received in an aperture 101 in an arm 102 extending from body 90. The lower end of manifold 89 is extended radially inward as a tube 103 connected with conduit 93 by a hollow fitting 104 having a stub shaft 105 received in bearing 80. Operation of motor 86 thus causes manifold 89 to rotate within filter 81, so that slot 95 is continuously in proximity with successively different circumferential portions of the inner surface of the filter.

A ring of apertures 110 are formed in base 62 outward of filter 81 to give communication with manifold 75. A shroud 111 in casing 63 consists of a flat annular portion 112, positioned radially in line with apertures 110, and a cylindrical portion 113 extending between base 62 and cover 64. Base 62 is provided with a ridge 114 to assist in positioning the shroud. Cylindrical portion 113 has a plurality of longitudinal slots 116 spaced circumferentially therearound. The shroud provides outlet valving means 120 and inlet valving means 121, the former including flappers or shutters 122 associated with apertures 110 and normally closing them, but arranged to open when the pressure within the shroud exceeds a predetermined value so as to give egress from within the shroud to manifold 75.

Inlet valving means 121 comprises a plurality of elongated flappers or shutters 123 associated with slots 116, and arranged to open inwardly when the pressure outside shroud 113 is greater than that within the shroud, and to close the slots when the pressure within the shroud is greater than that outside. Partitions 124 extend inwardly from cylindrical portion 113 between slots 116, to sites very close to filter 81, to compartmentalize the shroud, and may include inner circumferential lips 125.

OPERATION OF THE SECOND PREFERRED EMBODIMENT

The operation of this embodiment of the invention just described is as follows. Cleaner 60 is mounted on the engine or an inlet conduit 61 thereof, and when the engine is in operation a subambient pressure is maintained at aperture 74. Flappers 123 are generally open, and flappers 122 are generally closed. Air is drawn into the cleaner at apertures 66, passes through to the inlet valving means by opening flappers 123, and then through filter 81 to the engine, so that particulate matter is collected on the outer surface of the filter.

Motor 86 is connected for energization by a suitable source, and manifold 89 begins to rotate within the filter.

A compressor actuated by the engine is connected to connection 85 to continuously supply to conduit 93 and manifold 89 clean air at a pressure higher than that outside the filter. This air is supplied through slot 95 as a narrow jet impacting a narrow longitudinal strip of the inner surface of the filter, and prevented from spreading by wings 96 and 97.

When manifold 89 moves into a position where the jet from slot 95 enters a particular compartment of shroud 111, carrying with it particulate matter dislodged from the adjacent portion of filter 81, the pressure in the compartment increases to close flapper 123 and open flapper 122 of that compartment, thus interrupting the entry of air to be cleaned into that compartment and enabling the air containing dislodged particles to flow into manifold 75. Normal air flow continues to the rest of the filter, so that no appreciable interruption of the principle function of the cleaner takes place. When manifold 89 rotates into apposition with the next compartment, the pressure in the previous compartment drops and the flappers therein revert to their normal state.

From the above it will be evident that the invention comprises arrangements for preventing particles dislodged from a filter from becoming reattached to the filter, by providing a path for a small amount of air to sweep the dislodged particles away to a scavenging site, the arrangement comprising inlet and outlet valving means operated automatically by the rise of pressure internal to the cleaner which accompanies cleaning jet operation.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An air cleaner comprising, in combination:
a casing having a top wall, a bottom wall, an inlet for air to be cleaned and an axial outlet for cleaned air;
a filter mounted in said casing and positioned so as to separate said inlet from said outlet, said filter having a first, outer surface, a second, inner surface, and a substantially hollow interior defined by said inner surface, said interior being in fluid communication with said outlet, with entering air passing from said inlet to said outlet depositing particulate matter on said first surface of said filter with cleaned air passing through said filter interior to said outlet;
renewal means positioned in fluid communication with said filter interior for directing a flow of reverse-cleaning air against said second surface of said filter;
means for preventing redeposit, on said filter outer surface, of particulate matter dislodged by said renewal means, said means including a shroud positioned between and spaced apart from said filter and said casing and arranged so as to define a closed space therebetween, with said casing, said filter, and said shroud each being a substantially hollow cylinder;
inlet valve means in said shroud operative between a normal first, open condition, in which inflow of air from said inlet to said first surface of said filter is enabled, and a second, closed condition, in which reverse airflow of the air from said filter to said inlet is prevented;
and outlet valve means located between said shroud and said filter and generally opposite said inlet valve means, said outlet valve means comprising a plurality of spaced-apart apertures in said casing bottom wall and a plurality of resilient, pressure-responsive shutters aligned with said apertures for opening and closing said apertures, said outlet valve means being operative between a normal first, closed condition, in which inflow of air from said inlet to said filter first surface is prevented, and a second, open condition, in which a reverse-cleaning, scavenging flow of air from said renewal means is enabled to pass through said filter, said reverse flow of air causing the pressure within said space to be greater than the pressure at said inlet and dislodging particulate matter from said filter, with said shutters moving said outlet valve means into said second, open condition as a result of the rise of the pressure within said closed space,
whereby said inlet and said outlet valve means are operative simultaneously in said first conditions and alternately, simultaneously, in said second conditions.

2. An air cleaner comprising, in combination:
a casing having a top wall, a bottom wall, an inlet for air to be cleaned and an axial outlet for cleaned air;
a filter mounted in said casing and positioned so as to separate said inlet from said outlet, said filter having a first, outer surface, a second, inner surface, and a substantially hollow interior defined by said inner surface, said interior being in fluid communication with said outlet, with entering air passing from said inlet to said outlet depositing particulate matter on said first surface of said filter, and cleaned air passing through said filter interior to said outlet;
renewal means positioned in fluid communication with said filter interior for directing a flow of reverse-cleaning air against said second surface of said filter;
means for preventing redeposit, on said filter outer surface, of particulate matter dislodged by said renewal means, said means including a shroud positioned between and spaced apart from said casing and said filter, and defining a closed space therebetween, said casing, said filter and said shroud being substantially hollow cylinders;
said shroud including an end annulus and inlet valve means, said inlet valve means comprising a plurality of apertures in said end annulus and a plurality of resilient, pressure-responsive shutters positioned and arranged for opening and closing said apertures, said valve means being operative between a first, open condition in which inflow of air from said inlet to said filter first surface is enabled, and a second, closed condition in which reverse outflow of air from said filter to said inlet is prevented, said shutters moving said inlet valve means into said second, closed condition upon a rise of pressure within said closed space resulting from the operation of said renewal means;
and outlet valve means positioned between said shroud and said filter and generally opposite said inlet valve means, said outlet valve means being operative between a normal first, closed condition in which inflow of air from said inlet to said filter first surface is prevented, and a second, open condition in which a reverse-cleaning air flow from said renewal means is enabled to pass through said filter, said reverse-cleaning flow causing the pressure within said closed space to be greater than the pressure at said inlet, and carrying dislodged particulate matter out said open, outlet valve means, whereby said inlet and said outlet valve means are operative simultaneously in said first conditions and alternately in said second conditions.

3. An air cleaner comprising in combination:

a casing having a top wall, a bottom wall, an inlet for air to be cleaned and an axial outlet for cleaned air;

a filter mounted in said casing and positioned so as to separate said inlet from said outlet, said filter having a first outer surface, a second, inner surface and a substantially hollow interior defined by said inner surface, and a substantially hollow interior defined by said inner surface, said interior being in fluid communication with said outlet, with air passing from said inlet to said outlet depositing particulate matter on said first surface of said filter, with cleaned air passing through said filter interior to said outlet;

renewal means positioned in fluid communication with said filter interior for directing a flow of reverse-cleaning air against said second surface of said filter;

means for preventing redeposit, on said filter outer surface, of particulate matter dislodged by said renewal means, said means including a shroud positioned between and spaced apart from said casing and said filter, and defining a closed space therebetween, said casing, said filter and said shroud being substantially hollow cylinders;

said shroud including an end annulus and inlet valve means, said inlet valve means comprising a plurality of apertures in said annulus and a plurality of resilient, pressure-responsive shutters positioned and arranged for opening and closing said apertures, said inlet valve means being operative between a first, open condition in which inflow of air from said inlet to said filter first surface is enabled, and a second, closed condition in which reverse outflow of air from said filter to said inlet is prevented, said shutters moving said valve means into said second, closed condition upon a rise of pressure within said closed space resulting from the operation of said renewal means;

and outlet valve means positioned between said shroud and said filter and generally opposite said inlet valve means, said outlet valve means comprising a plurality of apertures in said casing and a plurality of resilient, pressure-responsive shutters for opening said apertures upon a rise of pressure within said closed space, said outlet valve means being operative between a normal first, closed condition in which inflow of air from said inlet to said filter first surface is prevented, and a second, open condition in which a reverse-cleaning, scavenging air flow from said renewal means is enabled to pass through said filter, said air flow causing the pressure within said space to be greater than the pressure at said inlet, and said reverse air flow carrying dislodged particulate matter out said open outlet valve means, whereby said inlet valve means and said outlet valve means are operative simultaneously in said first conditions and alternately in said second conditions.

* * * * *